Dec. 19, 1933.  A. M. DAY  1,940,296
ATTACHMENT FOR TRAPS
Filed Feb. 4, 1932

INVENTOR
Albert M. Day
By:
Menikheim
Attorney.

Patented Dec. 19, 1933

1,940,296

UNITED STATES PATENT OFFICE 1,940,296

ATTACHMENT FOR TRAPS

Albert M. Day, East Falls Church, Va., dedicated to the free use of the public

Application February 4, 1932. Serial No. 590,865

1 Claim. (Cl. 43—97)

(Granted under the act of March 3, 1883, as amended April 30, 1928; 370 O. G. 757)

This application is made under the act of March 3, 1883 as amended by the act of April 30, 1928 and the invention herein described may be manufactured and used by or for the Government for governmental purposes without the payment to me of any royalty thereon.

I hereby dedicate the invention herein described to the free use of the public, to take effect upon the granting of a patent to me.

The invention is a leaf spring which is adapted to be attached to a standard trap. It will permit the trap to catch predatory animals such as bobcats, coyotes and wolves, but will avoid catching birds such as magpies, ravens and eagles and small mammals such as porcupines, foxes, minks, martens, rabbits, squirrels and mice. The efficiency of a trap which is selective in the species of the animals trapped depends upon its being so constructed as to trip at a predetermined weight on the pan, which releases the trigger and allows the jaws of the trap to tightly close. The mechanism must be adjustable, so that the weight required to trip the trap can be varied with the requirements of the locality in which the traps are exposed.

In some localities it is desirable to set the traps so that such animals as porcupines, which sometimes weigh 15 pounds, will not be caught. In other places it will be necessary only to avoid catching light animals, such as squirrels and rabbits, and the tension will need be much less.

My invention conforms to such requirements in that it can be set so that weights on the pan, varying from two to five pounds, will spring the mechanism.

I found that the steel animal trap is best adapted for my leaf spring attachment which is attached at the base of the pan post and which contacts the under side of the trap pan. This creates the desired tension on the pan. The pan spring is provided with a slot approximately one and one fourth inches long and five eighths of an inch wide, the sides of which fit snugly under the beveled edges of the base of the pan post. When the spring is pulled as far out as possible, the tension is such that two pounds weight springs a set No. 4 trap, while, with the spring inserted to the apex of the slot, the tripping weight is increased to five pounds, on the same trap.

The invention is shown in the accompanying drawing.

Similar letters refer to similar parts throughout the several views.

Figure 1:
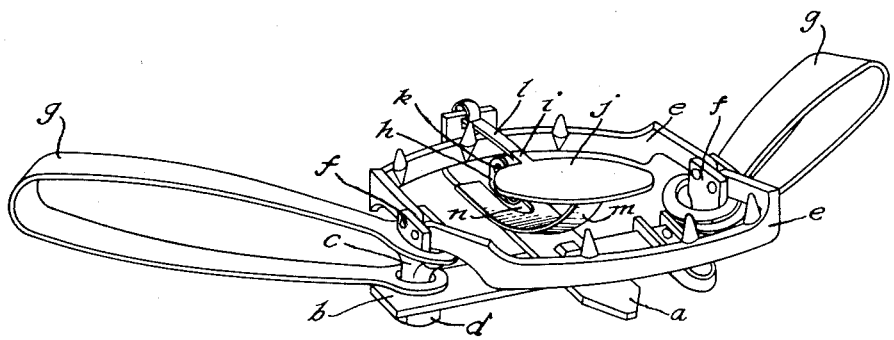
Fig. 1 shows the trap with the pan spring in place.
Figures 2, 3:
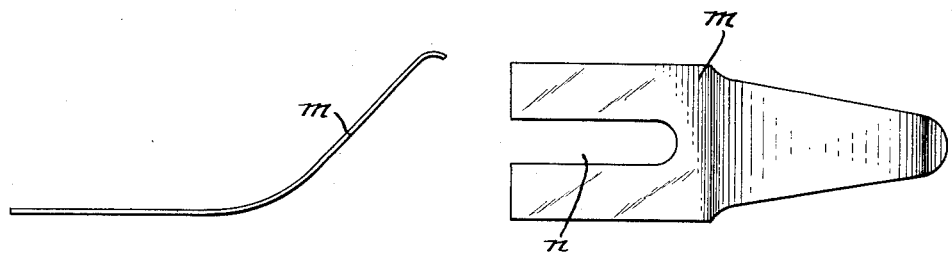
Fig. 2 is a side elevation of the pan spring and Fig. 3 is a plan view.

Referring to Fig. 1, it will be seen that the trap proper has a cross arm A, riveted at right angles, to the center of face B. At each end of face B is a hole in which is held jaw posts C, fastened to the base by nut D. Jaws E are attached to jaw posts C by means of rivets F extending through holes in the U of jaw posts C and holes in the ends of jaws E. Jaws E are actuated by springs G. Pan post H is riveted to cross arm A and carries arm I of pan J by means of rivet K. Trigger L fastens to the upturned end of the cross arm A and engages pan arm I by means of a notch. Pan spring M, for which this application is directed, slides under the beveled edges of pan post H, and lies flat on the top of cross arm A. The upturned end of pan spring M engages the under side of pan J, creating the desired tension. As the apex of slot N in the pan spring is moved toward pan post H, the tension is increased.

Having thus described the invention, what is claimed is new and for which a patent is desired by Letters Patent, is—

I claim:

In an animal trap having a base, jaw members pivotally mounted upon said base, spring means for actuating said jaw members, an upstanding post carried by said base, a treadle plate pivotally carried by said post, latch means connected to said base and cooperating with said treadle plate to hold the trap in set position; and a variable tension means comprising an elongated spring having a slot in one end adapted to detachably engage said post, the other end of said spring being arcuately curved to abut the under side of said treadle plate.

ALBERT M. DAY.